Nov. 17, 1964 SATOSHI SHIMADA 3,157,817

TRANSFORMER CIRCUIT FOR BALANCING CURRENT FLOW THROUGH PARALLEL SEMICONDUCTORS

Filed Aug. 24, 1960 3 Sheets-Sheet 1

Inventor
Satoshi Shimada by Hill, Sherman, Meroni, Gross & Simpson Attys.

Inventor
Satoshi Shimada
by Hill, Sherman, Meroni, Gross & Simpson Attys.

Inventor
Satoshi Shimada
by Hill, Sherman, Meroni, Gross & Simpson Attys.

3,157,817
Patented Nov. 17, 1964

3,157,817

TRANSFORMER CIRCUIT FOR BALANCING CURRENT FLOW THROUGH PARALLEL SEMICONDUCTORS

Satoshi Shimada, Tokyo, Japan, assignor to Sony Corporation, Tokyo, Japan, a corporation of Japan Filed Aug. 24, 1960, Ser. No. 51,576
Claims priority, application Japan Aug. 24, 1959
3 Claims. (Cl. 315—27)

This invention relates to a semiconductor parallel connection system and more particularly to a transistor parallel amplifier or diode parallel connection.

One object of this invention is to provide a transistor parallel amplifier which is adapted for an audio amplifier or deflection output amplifier in a television receiving apparatus.

Another object of this invention is to provide a transistor parallel amplifier, in which unbalanced amplification due to the difference of the characteristics of respective transistors connected in parallel is compensated to obtain stable parallel amplifying operation.

A still further object of this invention is to provide a diode parallel connection which is operated under stable and balanced condition.

Another object of this invention is to provide a combined connection system of a parallel transistor amplifier and a parallel diode device, which is adapted for a deflection output circuit in a television receiving apparatus.

Further objects, features and advantages of this invention will be more apparent from the description taken in connection with the accompanying drawing in which, FIG. 1 is a connection diagram of one example of transistor parallel amplifiers heretofore known.

Figure 1:
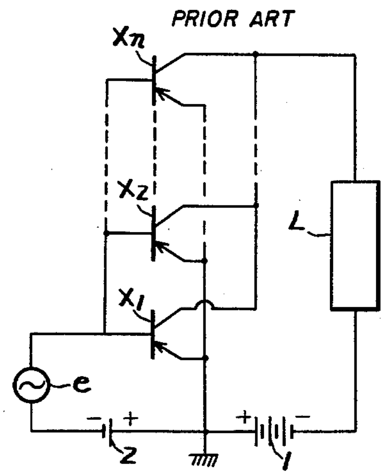
Figure 2:
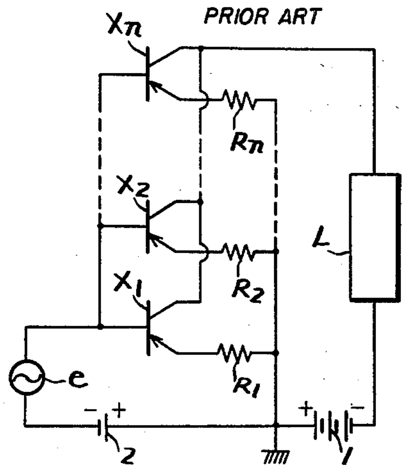
FIG. 2 is a connection diagram of another example of conventional transistor parallel amplifiers.

Before entering into the description of this invention, I will explain some of the transistor parallel amplifiers heretofore known, referring to FIGS. 1 and 2. In order to amplify an electric power by an amplifier, which has transistors connected in parallel, it has been usual to use such an amplifier as shown in FIG. 1, in which input terminals or bases of a plurality of transistors $X_1$, $X_2$, . . . $X_n$ are connected in parallel to an input signal source $e$; the output sides or the collectors are connected in parallel to a load L and the emitters thereof are also connected in parallel and earthed. 1 is a direct-current source and 2 represents a bias source for the bases of the transistors.

In such a parallel amplifier as shown in FIG. 1, substantially the same amplifying output cannot be obtained from individual transistors owing to the characteristic differences of transistors, especially a difference of input resistance, the current amplifying factors $\alpha$ and $\beta$. Accordingly one of the transistors is so overloaded that temperature rise occurs in its operation, by which the transistor becomes more unbalanced. Thus a conventional parallel amplifier has the disadvantage that a stable amplifying operation can not be expected.

In order to avoid this defect due to the aforesaid unbalance, resistors $R_1$, $R_2$ . . . $R_n$ in the amplifier have been connected respectively to emitters of the transistors $X_1$, $X_2$ . . . $X_n$ and earthed as shown in FIG. 2. In such a connection, however, it is only for controlling a current which flows through the unbalanced transistor, and the power loss, owing to the resistor insertion, is inevitable. Consequently such a parallel amplifier has not yet been sufficient.

Figure 9:
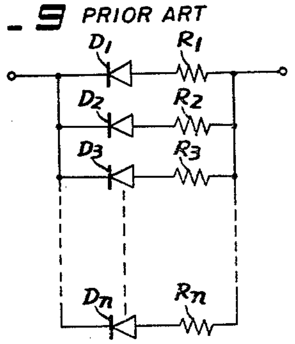
FIG. 9 PRIOR ART
FIG. 9 is a connection diagram of one example of diode parallel connections heretofore known.

The above mentioned defects can be recognized in a diode parallel connection system. In order to let the current flow through each diode by connecting a plurality of diodes in parallel to each other, it has been usual in a conventional device that resistors $R_1$, $R_2$ . . . $R_n$ are respectively connected in series to the diodes $D_1$, $D_2$ . . . $D_n$ as shown in FIG. 9, and that these series circuits are arranged in parallel relationship and thus the unbalance of the corresponding current of the diodes due to the difference of internal resistances of the respective diodes is adjusted by the resistor connected to each diode. It is inconvenient, however, to insert the resistors in series to the diodes because high power loss occurs due to the resistors.

Figure 3:
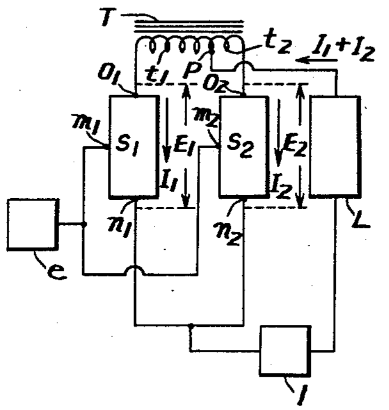
FIG. 3 is a schematic diagram of the device according to this invention.

Considering the above fact, this invention is intended to eliminate the above mentioned defects. Now I will explain the principle of this invention referring to FIG. 3 in which $S_1$ and $S_2$ represent respectively semiconductors for example such as transistors. The input electrodes $m_1$ and $m_2$ are connected in parallel to an input signal source $e$, and the output electrodes $n_1$ and $n_2$ are also connected in parallel with each other and to one terminal of the load L through electric source 1. The other output electrodes $O_1$ and $O_2$ are connected to the other terminal of the load L through electromagnetic coupling means T which is represented as a transformer in this example. Namely the electrodes $O_1$ and $O_2$ are respectively connected to both ends of the transformer T, the intermediate point P of which is connected to one terminal of the load L as shown in the drawing.

In the above connection, $I_1$ and $I_2$ designate respectively output currents passing respectively through the semiconductors $S_1$ and $S_2$, $E_1$ and $E_2$ represent respectively the voltage across the electrodes $O_1$ and $n_1$, and $O_2$ and $n_2$, due to the currents $I_1$ and $I_2$. Assuming that $P_1$ and $P_2$ represent respectively the power dissipation in operation of the semiconductors $S_1$ and $S_2$; and assuming $(P_1)$ max. and $(P_2)$ max., the maximum allowable power dissipation of the same, then the following formulae can be generally obtained:

$$P_1 \doteqdot E_1 \times I_1$$
$$P_2 \doteqdot E_2 \times I_2$$

In accordance with this invention the turn ratio of the parts $t_1$ and $t_2$ of the transformer T is so selected as to establish the following formula:

$$\frac{(P_1)\text{ max.}}{(P_2)\text{ max.}}=\frac{P_1}{P_2}$$

This formula means that the semiconductors $S_1$ and $S_2$ can be operative, corresponding respectively to the maximum allowable power dissipation thereof. By this relationship, the semiconductors $S_1$ and $S_2$ are operated under stable and balanced conditions. In case of $$(P_1)\text{ max.}=(P_2)\text{ max.}$$

the intermediate point P may be selected as the neutral point of the transformer T. In the parallel connection system using diodes, same principle of this invention will be understood even if the input electrodes $m_1$ and $m_2$ and the relative connection thereof will be dispensed with.

Now, the parallel connection system using transistors will be explained as follows; in this case, bases and collectors of a plurality of transistors are respectively connected in parallel, and emitters are also connected in parallel through electromagnetic coupling elements, whereby a conductive change of an unbalanced transistor will control the other transistors through the electromagnetic coupling element to obtain a balanced parallel amplifying effect among them.

Figure 4:
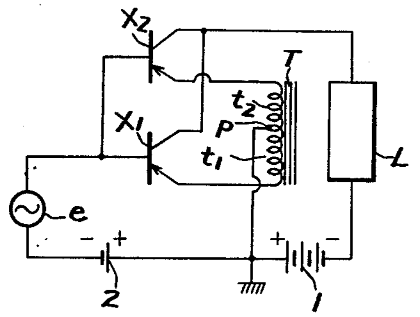
FIG. 4 is a connection diagram of a transistor parallel amplifier, by way of example, according to this invention.

In case of using two transistors $X_1$ and $X_2$ as shown in FIG. 4, the bases and collectors thereof are respectively connected in parallel; for instance, input signal source *e* is connected commonly to the bases and a load L is inserted commonly to the collectors of the transistors. Emitters of the two transistors are respectively connected to the opposite ends of an electromagnetic coupling element or transformer coil T and the substantial neutral point P of the coil is earthed.

According to the above mentioned connection, signals from the signal source *e* are respectively amplified in parallel at the transistors $X_1$ and $X_2$, and parallel amplified outputs are supplied to the load L. In this case, if characteristics of the two transistors $X_1$ and $X_2$ are equal, the respective emitter currents are equal and accordingly voltages of the same potential will be delivered to the emitters.

If, however, one of the two transistors, $X_1$, for example, becomes unbalanced with respect to the other transistor $X_2$ due to a change of $\beta$, and amplified current of the transistor $X_1$ is increased, with the result that the emitter current will be also increased.

In this case the potential of one end of a coil part $t_1$, between the neutral point P and the emitter of the transistor $X_1$, varies more in the negative direction so that the potential of the emitter goes to more negative direction from its previous potential. At the same time the voltage change occurred in the coil part $t_1$ causes an induction change of the potential in the other coil part $t_2$ between the neutral point P and the emitter of the transistor $X_2$, whereby electric potential with respect to the emitter of the transistor $X_2$ is changed to the positive direction quite reversely to the above mentioned.

Thus, by the parallel amplifier according to this invention, the increase of an output current of the transistor $X_1$ which enters in an unbalanced condition is compensated, and the output current of the transistor $X_2$ is increased, whereby the two transistors are maintained effectively in a balanced condition.

The above description has been mainly made in connection with the transistors $X_1$ and $X_2$ having substantially equal maximum power dissipation $(P_1)$ max. and $(P_2)$ max. respectively, but if $(P_1)$ max. and $(P_2)$ max. are unequal, the turn ratio of the parts $t_1$ and $t_2$ may be so selected that it is inversely proportional to that of $(P_1)$ max. and $(P_2)$ max., whereby the desired balanced and stable parallel connection amplifier is obtained.

Figure 5:
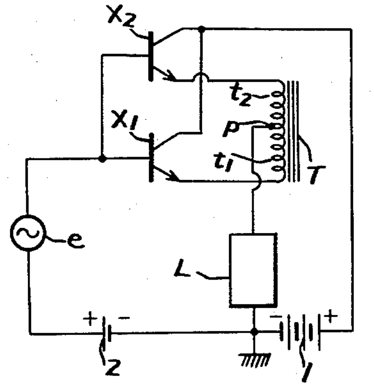
FIG. 5 is a connection diagram of another transistor parallel amplifier according to this invention.

An amplifier shown in FIG. 5 is constructed as an emitter follower type in which a load L is connected to a neutral point P of a transformer T and one end of which is earthed. The corresponding parts of this type of the amplifier to those of the amplifier shown in FIG. 4 are indicated with the same reference numerals as in FIG. 4. The transistors perform the same parallel amplifying operation with a balanced relationship as the former embodiment shown in FIG. 4.

Figure 6:
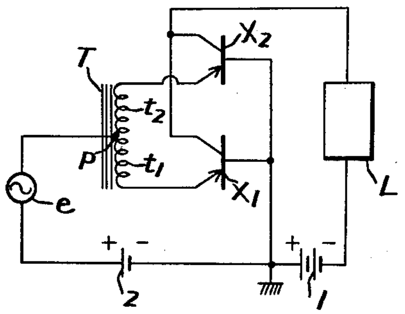
FIG. 6 is a connection diagram of a further example of transistor parallel amplifiers according to this invention.

FIG. 6 shows another amplifier constructed as a base earthed parallel amplifier, in which the neutral point P of the transformer T connected to an emitter is connected to an input signal source *e*. In such a case, the amplifier is so operated that unbalance of either one of the transistors to the other may be detected by the transformer T and that the two transistors may get in a balanced condition to each other.

It will be noted in this example that the output current is passing through source 1–bias source 2–signal source *e*–transformer T–emitters and collectors of the transistors $X_1$ and $X_2$–load L–source 1.

Figure 7:
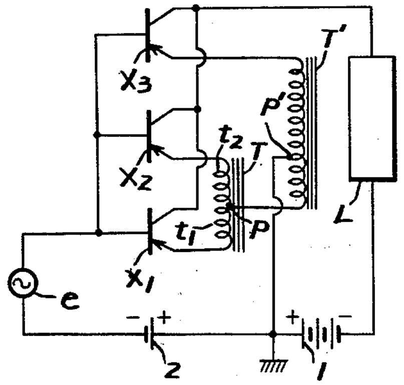
FIG. 7 is a connection diagram of a still further example of transistor parallel amplifiers according to this invention in which three transistors are connected in parallel.

I have explained parallel amplifiers using two transistors, but FIG. 7 shows a further embodiment in which three transistors are connected in parallel and a transformer T′ is inserted between the neutral point P of a transformer T which is arranged between emitters of the above mentioned transistors $X_1$ and $X_2$ and the emitter of a transistor $X_3$. In this amplifier, the transistors $X_1$, $X_2$ and $X_3$ are respectively in a balanced condition to one another; that is, a divided point P′ of the ratio of 2:1 is earthed.

The operation of this amplifier is the same as previously described and accordingly a further explanation will be omitted for the sake of simplicity.

Figure 8:
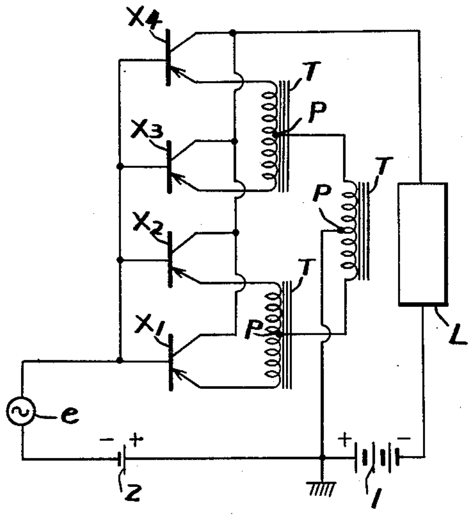
FIG. 8 is a connection diagram of a transistor parallel amplifier according to this invention in which four transistors are connected in parallel.

FIG. 8 shows an amplifier having four transistors and the connection thereof will be easily understood from the drawing. Moreover, it will be apparent that a parallel amplifier with a desired number of transistors can be so constructed as to operate in the same manner as hereinbefore described. Transistors of both P-N-P type and N-P-N type can be used in this invention.

It is apparent, of course, that this invention can be adapted for a parallel amplifier of an emitter earthed type, of a base earthed type and of a collector earthed one.

I have explained mainly transistor parallel connection amplifiers, but the principle of this invention can also be applied to diode parallel connection systems.

Figure 10:
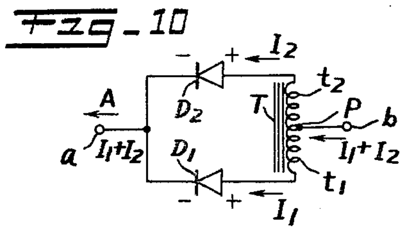
FIG. 10 is a connection diagram of a diode parallel connection device, by way of example, according to this invention.

Now, such a diode parallel connection device according to this invention will be explained as follows:

In FIG. 10, respective negative electrodes, for instance, of the two diodes $D_1$ and $D_2$ are connected in parallel to a terminal *a*; the positive electrodes, on the other hand, are respectively connected to both ends of an electromagnetic coupling element, namely a transformer T; the neutral point P is connected to a terminal *b* so that the two diodes are connected in parallel.

If a proper voltage is impressed across the terminals *a* and *b* in the above connection, a current $I_1+I_2$ flows in the direction shown by the arrow A through the diodes $D_1$ and $D_2$.

At this time if the internal resistances of the two diodes are equal to each other, the current of $$\frac{I_1+I_2}{2}$$

flows through the diodes respectively.

If, however, the internal resistance of one of the two diodes, $D_1$, for instance, is small or reduced, the two diodes are in such an unbalanced condition that the current more than $$\frac{I_1+I_2}{2}$$

will flow through the diode $D_1$. Accordingly, the electric potential of one end of the coil part $t_1$ between the neutral point P and the diode $D_1$ varies more in the negative direction and the electric potential of the positive electrode of the diode $D_1$ goes to the more negative direction from the previous potential. At the same time, the voltage change occurred in the coil part $t_1$ is induced to a coil part $t_2$, whereby the positive electrode potential of the diode $D_2$ is turned to the positive direction quite reversely to the above-mentioned. Thus the current passing through the diode $D_1$ is controlled to be decreased and the current passing through the diode $D_2$ is increased, whereby the two diodes are maintained effectively in a balanced condition to each other.

Figure 11:
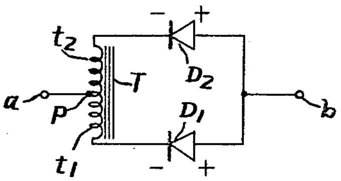
FIG. 11 is a connection diagram of another diode parallel connection device according to this invention.

FIG. 11 shows an example in which the electromagnetic coupling element T is arranged on the negative electrode side of the diodes $D_1$ and $D_2$ similarly to the above description and the operation thereof is the same as that mentioned above.

Figure 12:
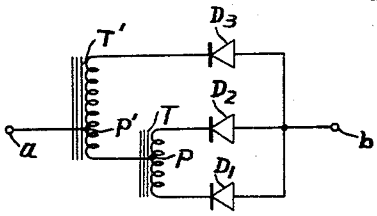
FIG. 12 is a connection diagram of a further example of diode parallel connection systems according to this invention.

FIG. 12 shows another example in which three diodes $D_1$, $D_2$ and $D_3$ are used. The same electromagnetic coupling element T' as that aforesaid is arranged between the neutral point P of the coil inserted between diodes $D_1$ and $D_2$, and the diode $D_3$, and a divided point P' of the ratio 2:1 at which the diodes $D_1$, $D_2$ and $D_3$ are respectively in the balanced condition is connected to the terminal *a*. Since the operation of this embodiment is the same as the previously described, a further detailed explanation will be omitted.

It will be also noted in the diode parallel connection system that a balanced and stable operation will be expected, even in the case of using diodes having different maximum allowable power dissipations with each other, by only selecting the turn ratio of the parts $t_1$ and $t_2$ corresponding to the characteristics of the diodes, in the same manner as described in the parallel connection system using transistors.

Figure 13:
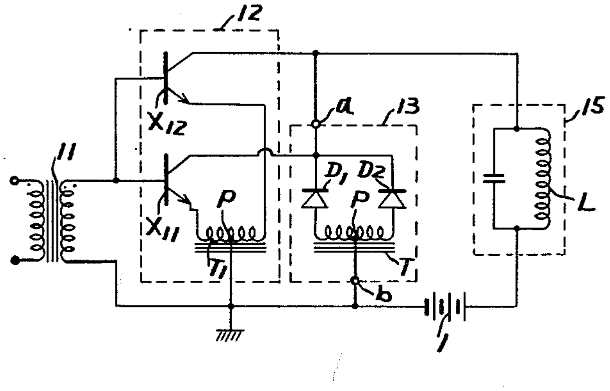
FIG. 13 is a connection diagram of a diode parallel connection system according to this invention, applied to a horizontal deflection output amplifier in a television receiving apparatus.

Referring to FIG. 13, I will continue the explanation of this invention for the case in which the device of this invention is applied to a horizontal deflection output circuit in a television receiving apparatus. 11 is a horizontal deflection signal input transformer, 12 is a transistor amplifier, 13 is a diode parallel connection device according to this invention and 15 is a horizontal deflecting coil which is a load. The transistor amplifier 12 is constructed as a parallel amplifier, in which bases of the respective transistors $X_{11}$ and $X_{12}$ are connected in parallel to each other and connected to the input transformer. The collectors of the transistors are also connected in parallel and further connected to the load L, to which a diode parallel connection device according to this invention is connected in the reverse direction. Between the emitters of the transistor is inserted an electromagnetic coupling element $T_1$ which is the same as that in the aforementioned example of FIG. 4 and the neutral point P thereof being earthed. This transistor parallel amplifier is also constructed in the same manner as previously mentioned in which the unbalance between the transistors can be decreased.

The operation of this example will be easily understood from the description hereinbefore made referring to FIG. 4.

According to the above-mentioned connection, the diodes $D_1$ and $D_2$ will effect as a damper to the horizontal deflecting coil 15, namely, the two diodes will become conductive with the balanced relationship and effect accurate damper action.

The diodes $D_1$ and $D_2$ actuating as dampers may be respectively connected in the reverse direction with respect to the transistors $X_1$ and $X_2$ across the emitters and collectors thereof in the circuit shown in FIG. 4.

Although I have hereinbefore explained some examples in which two or three diodes are used, it will be easily understood that the same operation and effect as those previously mentioned can be obtained by the connection system in which any desired number of diodes are used in parallel.

It will be understood that many modifications and variations may be effected without departing from the scope of the novel conceptions of this invention.

What is claimed is:

1. In a semiconductor parallel connection system,
a pair of transistors each having first, second and third electrodes,
first, second and third circuit points,
means connecting both of said first electrodes to said first circuit point,
transformer means including two inductively coupled windings connected between said second electrodes and said second circuit point,
means connecting both of said third electrodes to said third circuit point,
a deflection coil,
a supply voltage source,
means including said deflection coil and said supply voltage source connected in series between said first and second circuit points,
and means for applying a horizontal deflection signal between said third circuit point and one of the other circuit points to control current flow between said first and second electrodes and thereby control current flow through said deflection coil.

2. In a semiconductor parallel connection system,
a pair of transistors each having first, second and third electrodes,
first, second and third circuit points,
means connecting both of said first electrodes to said first circuit point,
transformer means including two inductively coupled windings connected between said second electrodes and said second circuit point,
means connecting both of said third electrodes to said third circuit point,
a deflection coil,
a supply voltage source,
means including said deflection coil and said supply voltage source connected in series between said first and second circuit points,
means for applying a horizontal deflection signal between said third circuit point and one of the other circuit points to control current flow between said first and second electrodes and thereby control current flow through said deflection coil,
a pair of semiconductor diodes having first and second electrodes,
second transformer means including two inductively coupled windings connected between said first electrodes of said diode and said second circuit point,
and means connecting said second electrodes of said diodes to said first circuit point.

3. In a television deflection coil system,
first and second circuit points,
deflection coil means and a supply voltage source connected in series between said first and second circuit points,
a pair of diodes each having first and second terminals,
a pair of transistors each having base, collector and emitter electrodes,
means for applying a horizontal deflection signal between said base electrodes of both of said transistors and said first circuit point,
first means connecting said first terminals of said diodes and said emitter electrodes of said transistors to said first circuit point,
and second means connecting said second terminals of said diodes and said collector electrodes of both of said transistors to said second circuit point,
one of said first and second means including transformer means having first winding means in circuit with one of said transistors and one of said diodes and second winding means in circuit with the other of said transistors and the other of said diodes, said first and second winding means being connected in opposed relation to increase the current through one of said diodes and one of said transistors in response to increased current through the other of said diodes and the other of said transistors.

References Cited in the file of this patent

UNITED STATES PATENTS

| | | |
|---|---|---|
| 2,005,875 | Silverman | June 25, 1935 |
| 2,666,819 | Raisbeck | Jan. 19, 1954 |
| 2,921,231 | Preisig | Jan. 12, 1960 |
| 2,926,267 | Radcliffe et al. | Feb. 23, 1960 |
| 2,941,154 | Rogers | June 14, 1960 |